US007779074B2

United States Patent
Surtani et al.

(10) Patent No.: US 7,779,074 B2
(45) Date of Patent: Aug. 17, 2010

(54) DYNAMIC DATA PARTITIONING OF DATA ACROSS A CLUSTER IN A DISTRIBUTED-TREE STRUCTURE

(75) Inventors: Manik Ram Surtani, London (GB); Jason Thomas Greene, Madison, WI (US)

(73) Assignee: Red Hat, Inc., Releigh, NC (US)

( * ) Notice: Subject to any disclaimer, the term of this patent is extended or adjusted under 35 U.S.C. 154(b) by 283 days.

(21) Appl. No.: 11/986,244

(22) Filed: Nov. 19, 2007

(65) Prior Publication Data
US 2009/0132657 A1 May 21, 2009

(51) Int. Cl.
*G06F 15/16* (2006.01)
*G06F 15/177* (2006.01)
(52) U.S. Cl. .................................. 709/205; 709/220
(58) Field of Classification Search .............. 709/205, 709/220
See application file for complete search history.

(56) References Cited

OTHER PUBLICATIONS

Ban et al., JBoss Cache TreeCache—A Structured, Replicated, Transactional Cache : User Documentation Release 1.4.0 'Jalapeno', Jul. 2006, JBoss, p. 1-79.*
Ben Wang, JBoss Cache as a POJO Cache, Nov. 9, 2005, pp. 1-13, Published on ONJava.com.

* cited by examiner

*Primary Examiner*—Vivek Srivastava
*Assistant Examiner*—Taylor Elfervig
(74) *Attorney, Agent, or Firm*—Blakely, Sokoloff, Taylor & Zafman LLP

(57) ABSTRACT

A method and apparatus for dynamically partitioning data across a cluster in a tree-based structure is disclosed. In one embodiment, cache nodes in the cluster are detected. A partition group is formed with members including one or more cache nodes of the cluster. An instance of a cache node in the partition group is copied to each cache node in the partition group. The membership of the partition group is adjusted based on a participation of data in the partition group.

15 Claims, 8 Drawing Sheets

US 7,779,074 B2

DYNAMIC DATA PARTITIONING OF DATA ACROSS A CLUSTER IN A DISTRIBUTED-TREE STRUCTURE

TECHNICAL FIELD

Embodiments of the present invention relate to cache, and more specifically to a tree-structured clustered cache.

BACKGROUND

Caches are commonly used in computer system. A cache is a collection of data duplicating original values stored elsewhere or computed earlier, where the original data is expensive to fetch (due to slow access time) or to compute, relative to the cost of reading the cache. In other words, a cache is a temporary storage area where frequently accessed data can be stored for rapid access. Once the data is stored in the cache, future use can be made by accessing the cached copy rather than re-fetching or recomputing the original data, so that the average access time is lower.

Caches have proven to be extremely effective in many areas of computing because access patterns in typical computer applications have locality of reference (temporal and spatial locality). Temporal locality refers to data that are accessed close together in time. Spatial locality refers to data that might or might not be located physically close to each other.

In a clustered tree-structured cache, the cluster may also provide redundant storage for security and backup purposes by replicating data to all instances in the cache cluster. However, replicating to all instances may prove to impact memory and network traffic every time another instance is added to a cluster.

DESCRIPTION OF THE DRAWINGS

The present invention is illustrated by way of example, and not by way of limitation, in the figures of the accompanying drawings and in which.

DETAILED DESCRIPTION

Described herein is a method and apparatus for dynamically replicating cache nodes in a tree-based cache cluster. A method and apparatus for dynamically partitioning data across a cluster in a tree-based structure is disclosed. In one embodiment, cache nodes in the cluster are detected. A partition group is formed with members including one or more cache nodes of the cluster. An instance of a cache node in the partition group is copied to each cache node in the partition group. The membership of the partition group is adjusted based on a participation of data in the partition group.

Buddy Replication

Buddy replication is based on a concept where data is replicated to a finite number of nodes in a cluster rather than the entire cluster. Some of the benefits of buddy replication include reduction of network replication traffic and reduction of node memory usage as more nodes are added.

Network traffic is restricted to the number of buddy nodes configured. This may be used to broadcast changes. When the number of buddies is finite and fixed, nodes can be added to a cluster without any such impact as this replication cost is static.

Memory usage for each node will be approximately (b+1) X where X is the average data size of each node and b is the number of buddies per node. This amounts to less than total replication where each node would hold nX where n is the number of nodes in the cluster. Being a function of n, memory usage per node increases with the number of nodes while with buddy replication, this does not happen.

Partitioning is the concept of breaking up state in the cache and spreading it around a cluster, on sufficient nodes so that there will always be a backup somewhere, and with intelligent enough a data gravitation algorithm such that the data is always efficiently available on any given node.

Figure 1:
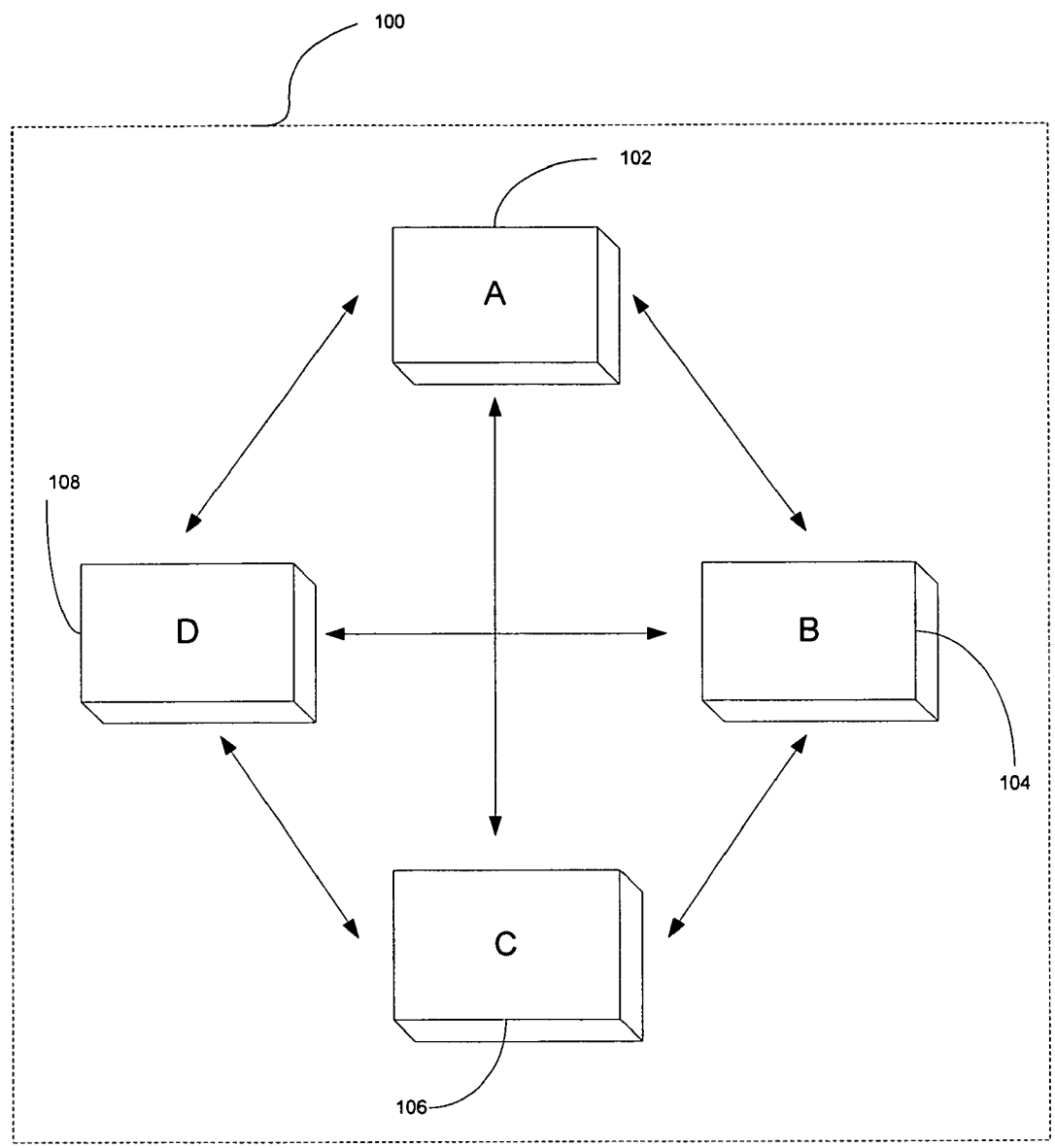
FIG. 1 illustrates a block diagram of replicated node caches in a cluster.

FIG. 1 illustrates a block diagram of replicated node caches in a cluster 100. An instance of a cache node is replicated to all cache nodes in the cluster. As such, data from cache node 102 is replicated to cache nodes 104, 106, and 108. Data from cache node 104 is replicated to cache nodes 102, 106, and 108. Data from cache node 106 is replicated to cache nodes 102, 104, and 108. Data from cache node 108 is replicated to cache nodes 102, 104, and 106.

Figure 2:
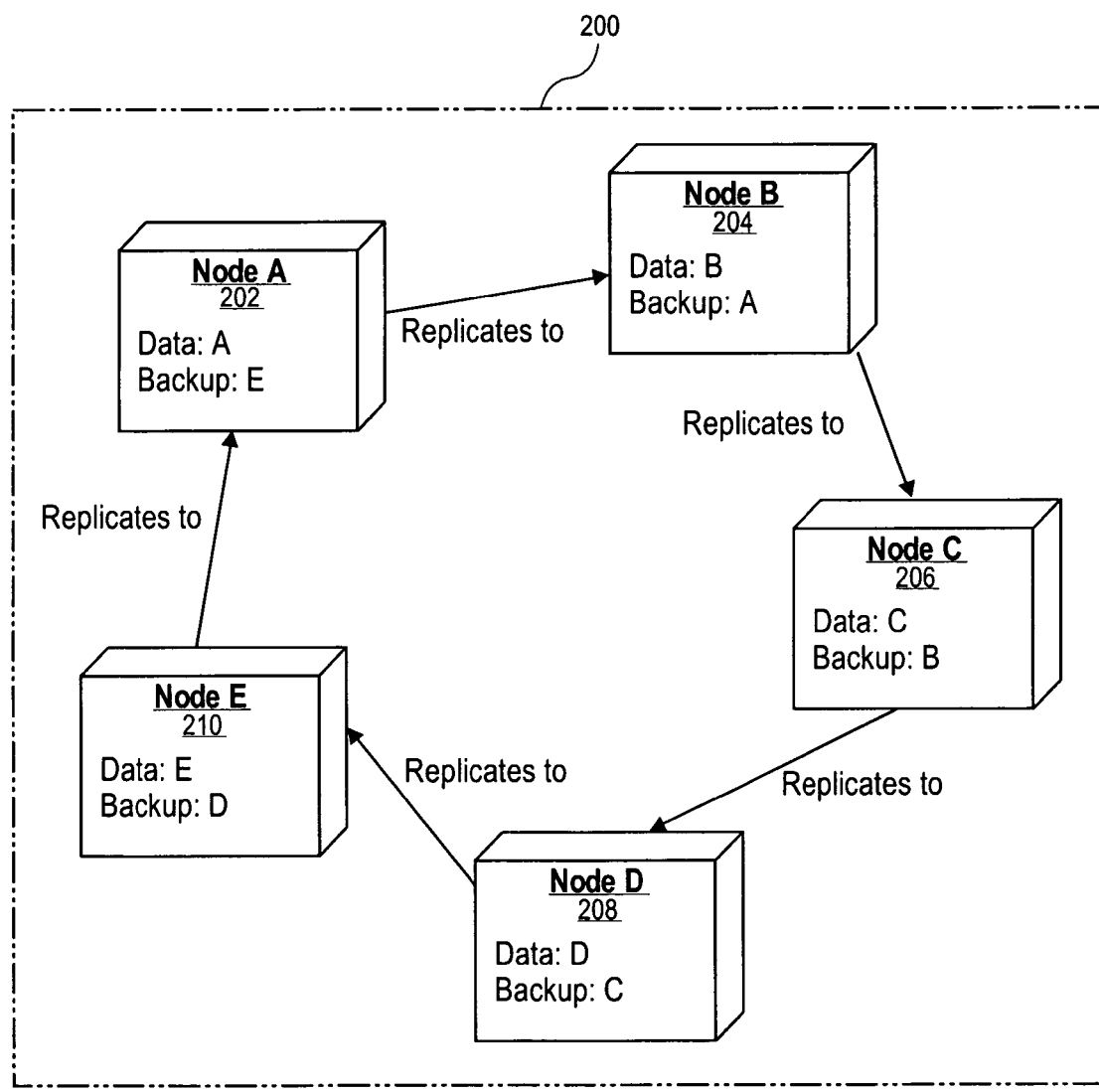
FIG. 2 illustrates a block diagram of a cluster with buddy replication of node caches.

FIG. 2 illustrates a block diagram of a cluster with buddy replication of node caches. For illustration purposes, the number of buddies is set to one. FIG. 2 illustrates five nodes in a cluster: nodes A, B, C, D and E. Each node has store its own data, and the backup data of one other node. For example, node A 202 stores its own data from node A 202 and data from node E 210. Node B 204 stores its own data from node B 204 and data from node A 202. Node C 206 stores its own data from node C 206 and data from node B 204. Node D 208 stores its own data from node D 208 and data from node C 206. Node E 210 stores its own data from node E 210 and data from node D 208. As such, data is only replicated to the buddy node, not to the entire cluster (synchronous or asynchronous replication may be used).

Figure 3:
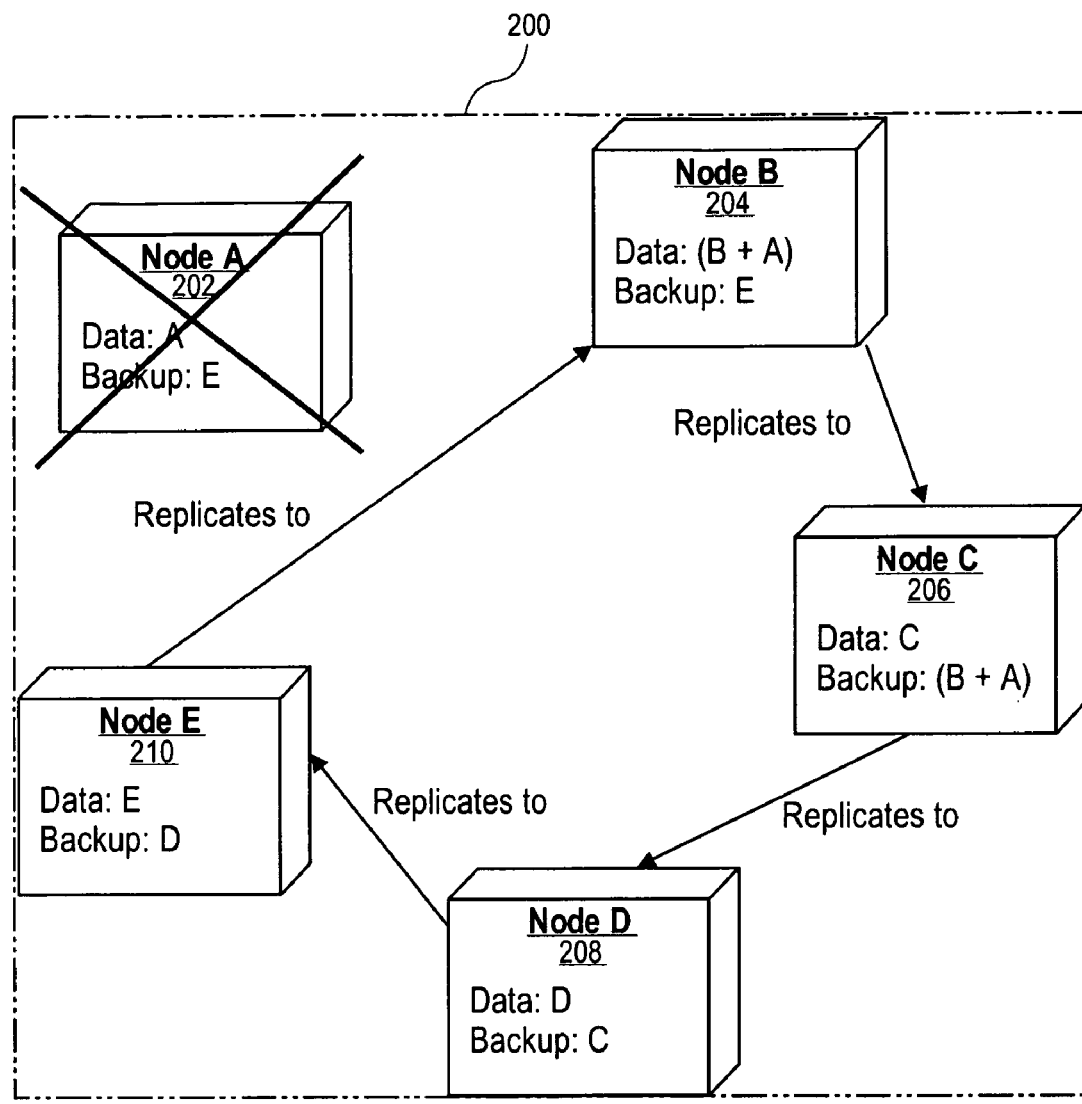
FIG. 3 illustrates a block diagram of a node failure in a cluster with buddy replication enabled.

FIG. 3 illustrates a block diagram of a node failure in a cluster with buddy replication enabled. If a node fails (e.g., node A 202 is removed from the cluster) its data is still backed up on to node B 204. As nodes start looking for this data, it gravitates from node B 204 to the requesting node, which may take ownership of this data and treat it as its own. Node B 204 may also start acting as backup node for node E 210.

As requests come in to cache instances which do not have the requested data locally, nodes then ask the cluster for the data and move that data to their local state. Taking ownership of this data allows for the data most used by specific cache instances to be located closest to such cache instances. When a cache instance takes ownership of data, it forces the original owner (and any buddies) to remove this data from their in-memory state. In the above scenario of FIG. 3, this allows for the original state of A—backed up on B—to spread out evenly across the cluster as the load balancer directs requests meant for A across the cluster.

One of the most common use cases of Buddy Replication is when a replicated cache is used by a servlet container to store HTTP session data. One of the pre-requisites to buddy replication working well and being a real benefit is the use of session affinity, more casually known as sticky sessions in HTTP session replication speak. What this means is that if certain data is frequently accessed, it is desirable that this is always accessed on one instance rather than in a round-robin fashion as this helps the cache cluster optimize how it chooses buddies, where it stores data, and minimizes replication traffic. However, the requirement of session affinity is still restrictive on other use cases—such as in data grids where data access patterns are not fixed.

Dynamic Partitioning of Data Across a Cluster

Buddy replication effectively solves the scalability issue encountered when dealing with synchronous state replication, but imposes a very restrictive rule that session affinity must be present. While this fits in perfectly with usage where session affinity is available anyway (state replication for HTTP sessions and EJB SFSBs) this is still restrictive on other use cases—such as in data grids where data access patterns are not fixed.

In one embodiment, one way to overcome the session affinity requirement still uses BuddyGroups to define a partition group. However, buddies in the group are treated as peers, rather than data owners. Just like with buddy replication described above, changes are replicated to the entire partition group. Data gravitation is still used as a means of querying the cluster and gravitating data back. However, when data is gravitated back, rather than removing data from the sender, the receiver joins the partition group of the sender. A cache instance can be in several partition groups.

Each cache instance runs a Partition Maintenance Thread to make sure a distributed eviction takes place based on hard and soft upper and lower limits that define how many copies of each data element should exist in the partition group. In one embodiment, eviction algorithms may be used in deciding which cache instances should evict state. Regions would be the granularity of tree nodes moved around.

A Metadata of the partition group may consist of the region they represent, and peers in the group—would be replicated across the entire cluster. This may be used to prevent unnecessary gravitation attempts for data that may not exist.

Figure 4:
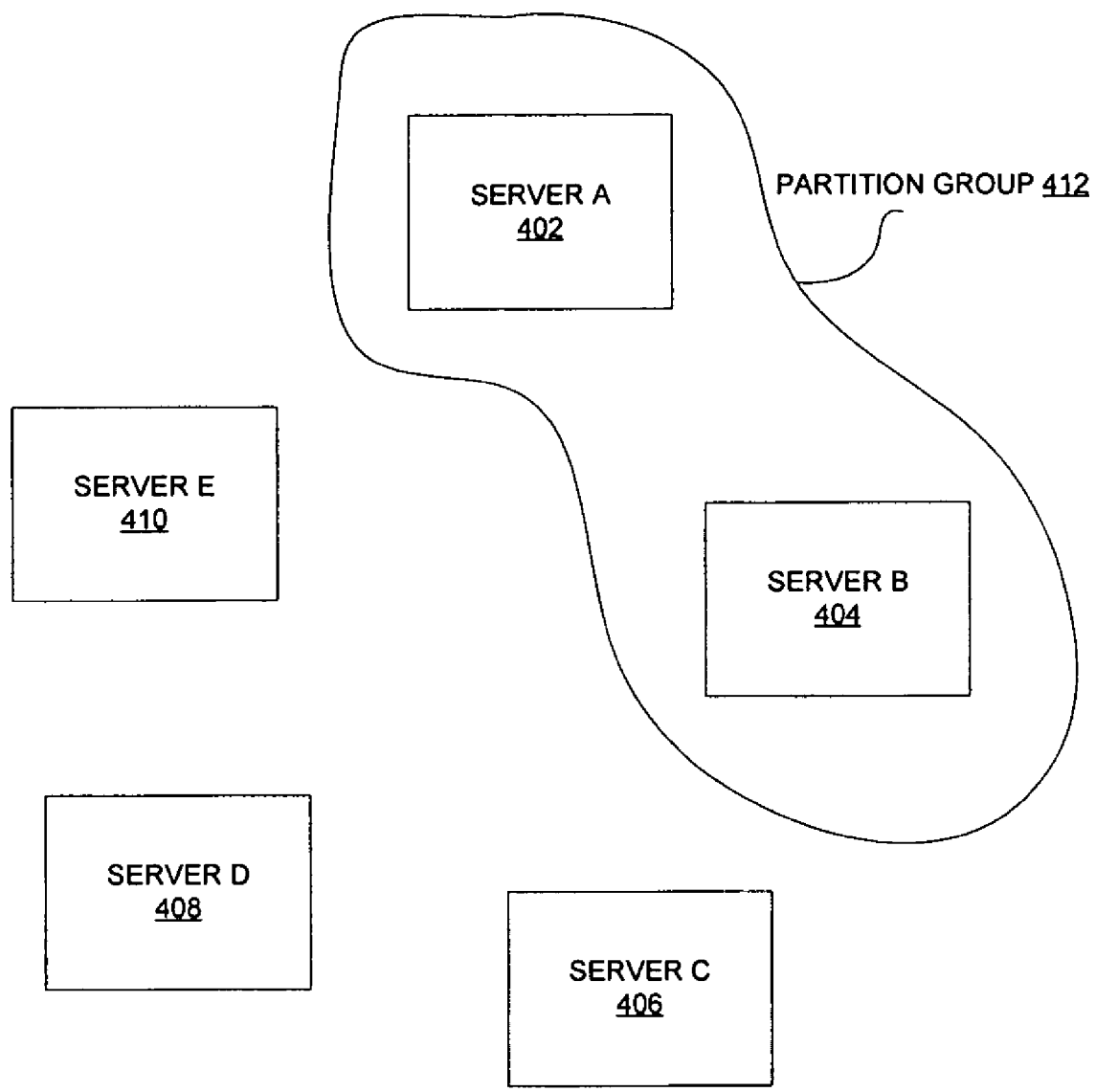
FIG. 4 illustrates a block diagram of an initial partition group for a given region of data in accordance with one embodiment.

FIG. 4 illustrates a block diagram of an initial partition group for a given region of data in accordance with one embodiment. For illustration purposes, FIG. 4 illustrates five servers: server A 402, server B 404, server C 406, server D 408, server E 410. An initial partition group 412 including server A 402 and server B 404 form node /a/b.

Figure 5:
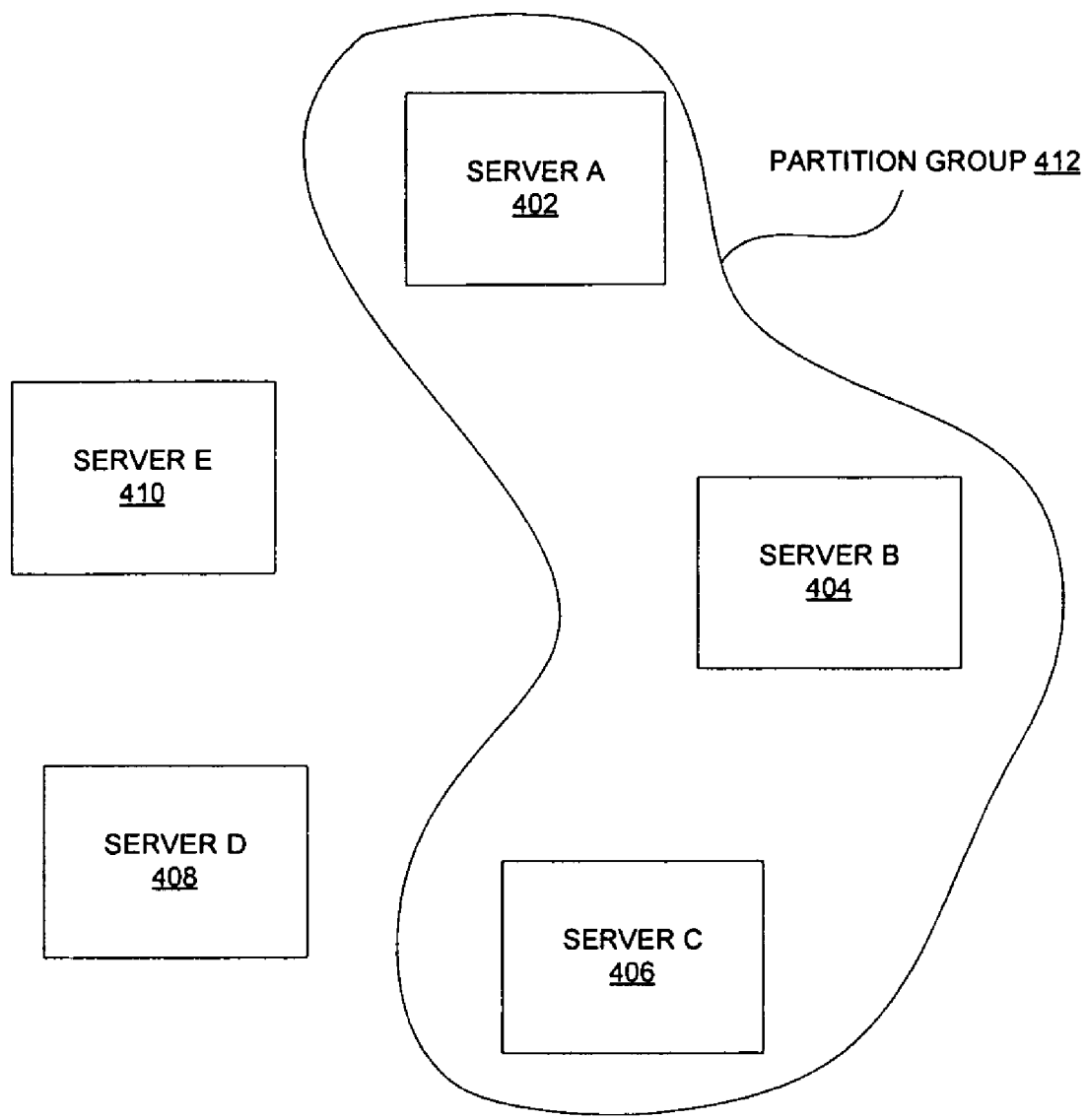
FIG. 5 illustrates a block diagram of a growing partition group in accordance with one embodiment.

FIG. 5 illustrates a block diagram of a growing partition group in accordance with one embodiment. Server C 406 attempts to look up node /a/b. By looking at the metadata of node /a/b, server C 406 knows that this is a defined region 412 and server C 406 attempts to join the partition region 412. This is allowed since this is within the upper and lower limits for the number of peers per partition. Those of ordinary skills in the art will recognize that these parameters are adjustable. When server C 406 attempts to join partition region 412, a partial state transfer event is triggered and updated metadata are to be broadcast to redefine partition region 412.

Figure 6:
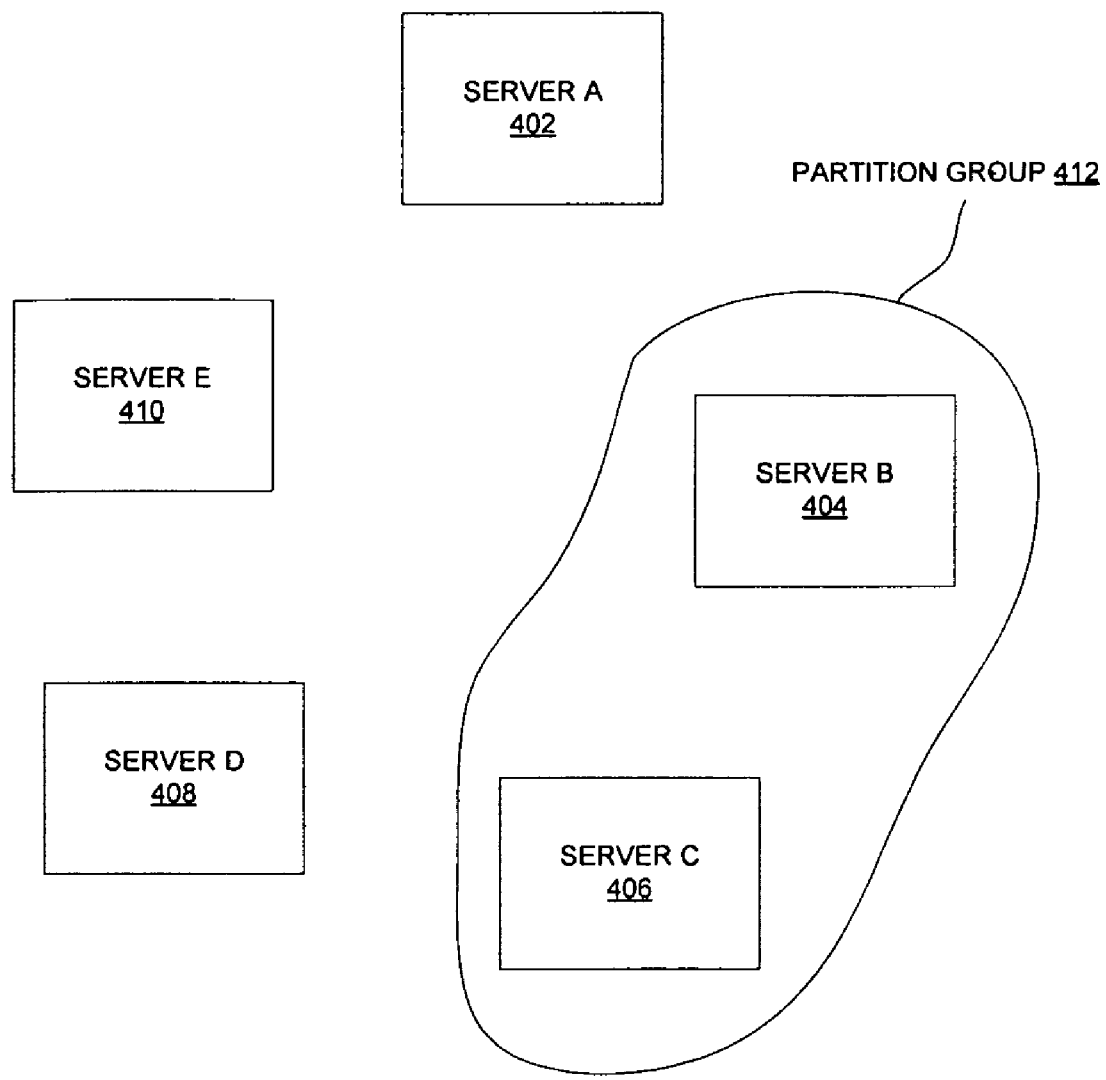
FIG. 6 illustrates a block diagram of a shrinking partition group in accordance with one embodiment.

FIG. 6 illustrates a block diagram of a shrinking partition group in accordance with one embodiment. For illustration purposes, let's assume that the configuration's soft limit include a maximum of two servers for a given partition region. After a period of time, one server will be selected for removal from the partition region 412.

The dynamic growth and shrinking of the partition region can be based on configurable algorithms that can involve voting and consensus within the partition region, and updated metadata being broadcast.

Distributed Eviction

As the PartitionManagementThread runs and decides that a partition has too many members (based on hard and soft limits), a voting protocol commences to determine which instances should be forced to leave the partition. Partition member that initiates the distributed eviction broadcasts a "DE" message to partition members. Each partition member reports a single value representing the 'participation weight' in that partition to the initiator. The initiator uses this to select which member or members have the lowest partition, based on the number of members that need to leave the partition group. In the event of a tie, the first instance in the tie is selected.

The initiator then broadcasts its 'decision' on the instance that is elected to leave the partition. This will contain a new PartitionGroup and updates region metadata. The elected members respond with an acknowledgment, evicts the partition state from memory and leaves the partition. The other instances just respond with an acknowledgment.

Striping

Taking the concept of partitioning further, there is more that can be done if the cache were to be used to store very large data items (for example, a DVD—a byte of 4 GiB). Using RAID-style error correction algorithms, the byte could be broken up into chunks, the chunks stored in various nodes in the tree, each node defined as a separate partition. The alternative is to break down the replication granularity of the tree into something smaller than a tree node requiring implicit knowledge of the relationships between the attributes in a node.

Computer System

Figure 7:
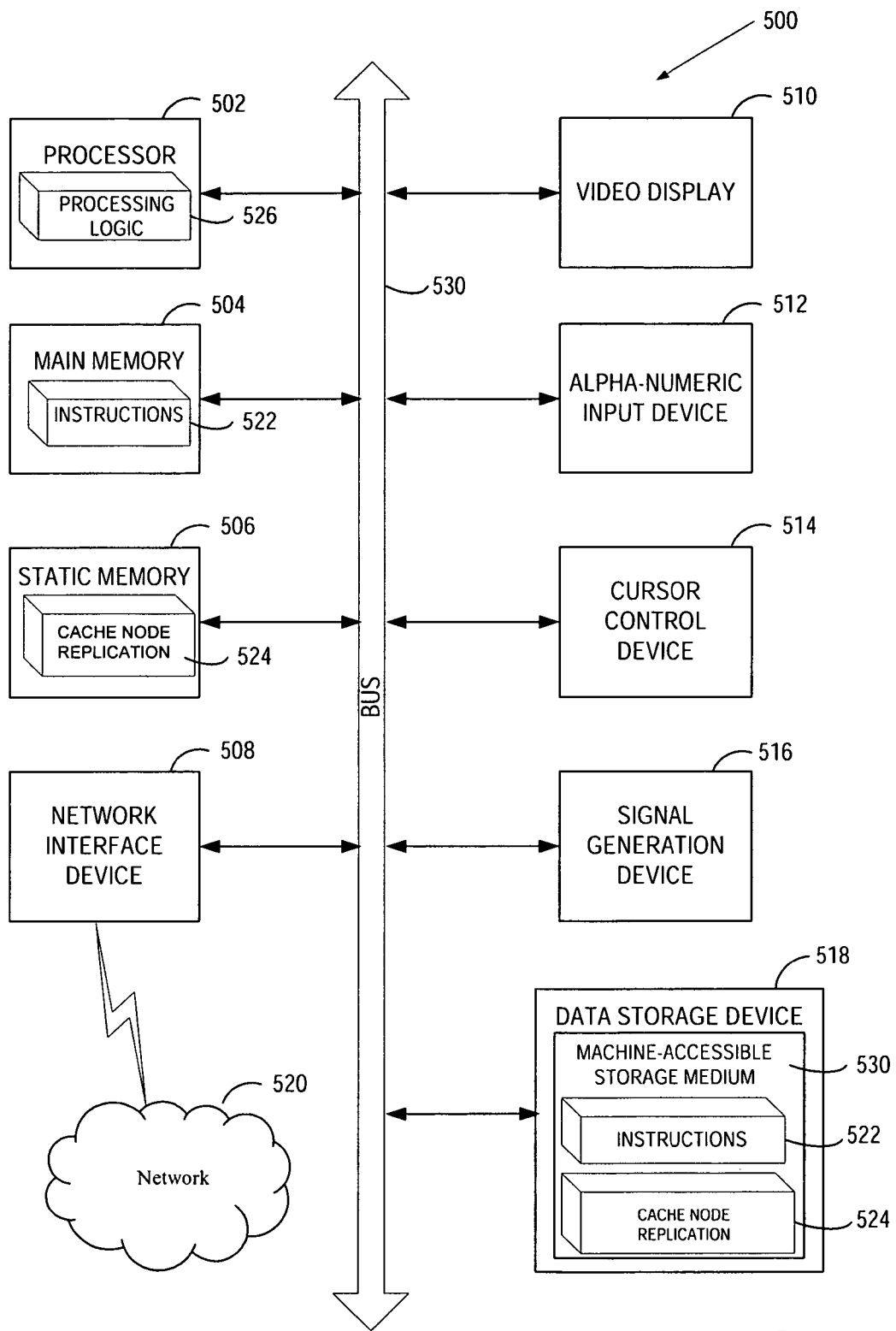
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store dynamic partitioning instructions 724. Dynamic partitioning instructions 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 8:
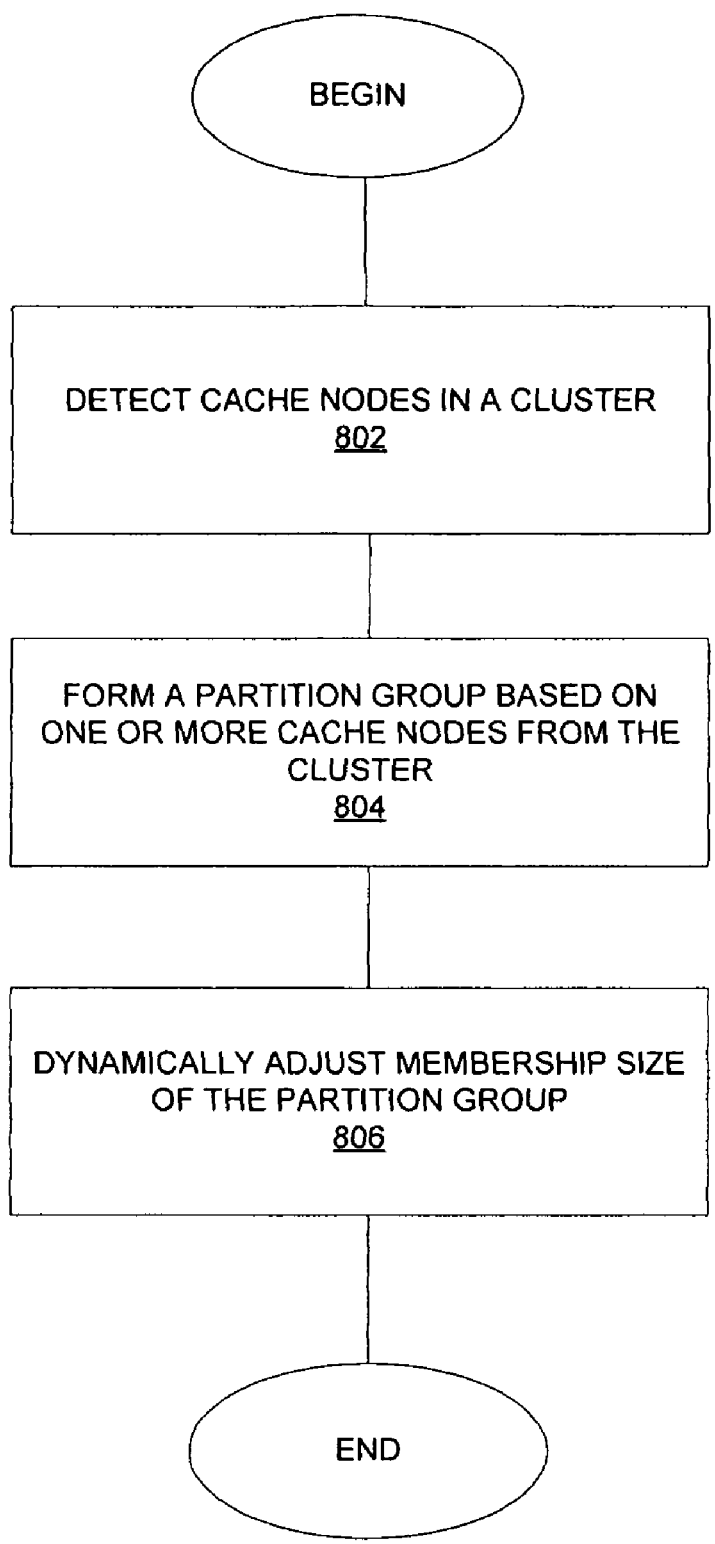
FIG. 8 illustrates a flow diagram of one embodiment of a method for dynamically replicating cache nodes in a cluster.

FIG. 8 illustrates a flow diagram of one embodiment of a method for dynamically partitioning data across a cluster in a distributed-tree structure. At 802, cache nodes in the cluster are detected. At 804, a partition group comprising one or more cache nodes of the cluster is formed. An instance of a cache node in the partition group is copied to each cache node in the partition group. At 806, a membership size of the partition group is adjusted based on a participation of data in the partition group.

In one embodiment, a new cache node is added to the partition group. The new cache node accesses data from a cache node in the partition group and copies an instance of the cache nodes in the partition group to the new cache node.

In another embodiment, the membership size of the partition group is adjusted based on a partition maintenance thread of the one or more node caches of the partition group. The partition maintenance thread comprises a hard upper membership size limit, a soft upper membership size limit, a hard lower membership size limit, a soft lower membership size limit, the limits defining how many copies of each data element can exist in the partition group.

In another embodiment, a cache node is removed from the partition group in response to the membership size of the partition group exceeding the hard upper membership size limit.

In another embodiment, a cache node is removed from the partition group in response to a distributed eviction initiated by an initiating cache node from the partition group.

In the above description, numerous details are set forth. It will be apparent, however, to one skilled in the art, that the present invention may be practiced without these specific details. In some instances, well-known structures and devices are shown block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Thus, a method and apparatus for replicating cache nodes in a tree-structure cache cluster have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for dynamically partitioning data across a cluster in a tree-based structure, the method comprising:
   detecting cache nodes in the cluster;
   forming a partition group comprising one or more cache nodes of the cluster, wherein an instance of a cache node in the partition group is copied to each cache node in the partition group;
   adjusting a membership size of the partition group based on a participation of data in the partition group;
   broadcasting a distributed eviction message to each member of the partition group by the initiating cache node;
   reporting a single value representing a participation weight by each member to the initiating cache node;
   determining, at the initiating cache node, an evicted member based on which member has the lowest participation weight; and
   broadcasting, by the initiating cache node, an updated membership of the partition group;
   adjusting the membership size of the partition group based on a partition maintenance thread of the one or more node caches of the partition group,
   wherein the partition maintenance thread comprises a hard upper membership size limit, a soft upper membership size limit, a hard lower membership size limit, a soft lower membership size limit, the limits defining how many copies of each data element can exist in the partition group,
   wherein the evicted member deletes an instance of the state of the cache nodes of the partition group from its memory, and leave the partition group,
   wherein the participation weight is calculated based on a degree of participation in the past with different weights as to different periods of time.

2. The computer-implemented method of claim 1 wherein adjusting further comprises:
   adding a new cache node to the partition group, wherein the new cache node accesses data from a cache node in the partition group; and
   copying an instance of the cache nodes in the partition group to the new cache node.

3. The computer-implemented method of claim 1 further comprising:
   removing a cache node from the partition group in response to the membership size of the partition group exceeding the hard upper membership size limit.

4. The computer-implemented method of claim 1 further comprising:
   removing a cache node from the partition group in response to a distributed eviction initiated by an initiating cache node from the partition group.

5. The computer-implemented method of claim 1 wherein a metadata is associated with the partition group, the metadata comprising an identification of a region represented by the partition group and an identification of peer cache nodes in the partition group.

6. An apparatus for dynamically partitioning data across a cluster in a tree-based structure comprising:
   a server configured to detect cache nodes in the cluster, to form a partition group comprising one or more cache nodes of the cluster, wherein an instance of a cache node in the partition group is copied to each cache node in the partition group, to adjust a membership size of the partition group based on a participation of data in the partition group, to broadcast a distributed eviction message to each member of the partition group by the initiating cache node, to report a single value representing a participation weight by each member to the initiating cache node, to determine at the initiating cache node, an evicted member based on which member has the lowest participation weight, to broadcast, by the initiating cache node, an updated membership of the partition group, and to adjust the membership size of the partition group based on a partition maintenance thread of the one or more node caches of the partition group,
   wherein the partition maintenance thread comprises a hard upper membership size limit, a soft upper membership size limit, a hard lower membership size limit, a soft lower membership size limit, the limits defining how many copies of each data element can exist in the partition group,
   wherein the evicted member deletes an instance of the state of the cache nodes of the partition group from its memory, and leave the partition group,
   wherein the participation weight is calculated based on a degree of participation in the past with different weights as to different periods of time.

7. The apparatus of claim 6 wherein the server is configured to:
   add a new cache node to the partition group, wherein the new cache node accesses data from a cache node in the partition group; and
   copy an instance of the cache nodes in the partition group to the new cache node.

8. The apparatus of claim 6 wherein the server is configured to:
   remove a cache node from the partition group in response to the membership size of the partition group exceeding the hard upper membership size limit.

9. The apparatus of claim 6 wherein the server is configured to:
   remove a cache node from the partition group in response to a distributed eviction initiated by an initiating cache node from the partition group.

10. The apparatus of claim 6 wherein a metadata is associated with the partition group, the metadata comprising an identification of a region represented by the partition group and an identification of peer cache nodes in the partition group.

11. A computer-readable storage medium, having instructions stored therein, which when executed, cause a computer system to perform a method comprising:
    detecting cache nodes in the cluster;
    forming a partition group comprising one or more cache nodes of the cluster, wherein an instance of a cache node in the partition group is copied to each cache node in the partition group;
    adjusting a membership size of the partition group based on a participation of data in the partition group;
    broadcasting a distributed eviction message to each member of the partition group by the initiating cache node;
    reporting a single value representing a participation weight by each member to the initiating cache node;
    determining, at the initiating cache node, an evicted member based on which member has the lowest participation weight;
    broadcasting, by the initiating cache node, an updated membership of the partition group; and
    adjusting the membership size of the partition group based on a partition maintenance thread of the one or more node caches of the partition group, wherein the partition maintenance thread comprises a hard upper membership size limit, a soft upper membership size limit, a hard lower membership size limit, a soft lower membership size limit, the limits defining how many copies of each data element can exist in the partition group, wherein the evicted member deletes an instance of the state of the cache nodes of the partition group from its memory, and leave the partition group, wherein the participation weight is calculated based on a degree of participation in the past with different weights as to different periods of time.

12. The computer-readable storage medium of claim 11 wherein the method further comprises:

adding a new cache node to the partition group, wherein the new cache node accesses data from a cache node in the partition group; and copying an instance of the cache nodes in the partition group to the new cache node.

13. The computer-readable storage medium of claim 11 wherein the method further comprises:

removing a cache node from the partition group in response to the membership size of the partition group exceeding the hard upper membership size limit.

14. The computer-readable storage medium of claim 11 wherein the method further comprises:

removing a cache node from the partition group in response to a distributed eviction initiated by an initiating cache node from the partition group.

15. The computer-readable storage medium of claim 11 wherein a metadata is associated with the partition group, the metadata comprising an identification of a region represented by the partition group and an identification of peer cache nodes in the partition group.

\* \* \* \* \*